United States Patent [19]

Saupe

[11] 4,062,771
[45] Dec. 13, 1977

[54] APPARATUS AND PROCESS FOR MEMBRANE FILTRATION

[75] Inventor: Wolfram Saupe, Konigsstein, Germany

[73] Assignee: Hoechst Aktiengesellschaft, Frankfurt am Main, Germany

[21] Appl. No.: 694,345

[22] Filed: June 9, 1976

[30] Foreign Application Priority Data

June 11, 1975 Germany .............................. 2525972

[51] Int. Cl.² ........................................ B01D 31/00
[52] U.S. Cl. ............................. 210/23 F; 210/23 H; 210/304; 210/321 R; 210/321 A; 210/433 M; 210/496
[58] Field of Search ............... 210/23 H, 23 F, 321 R, 210/346, 304, 433 M, 496

[56] References Cited

U.S. PATENT DOCUMENTS

| | | | |
|---|---|---|---|
| 3,392,840 | 7/1968 | Clark et al. | 210/496 X |
| 3,462,362 | 8/1969 | Kollsman | 210/23 H |
| 3,494,465 | 2/1970 | Nyrop | 210/346 X |
| 3,504,801 | 4/1970 | Alexander | 210/346 X |
| 3,508,994 | 4/1970 | Nyrop | 210/321 R X |
| 3,610,418 | 10/1971 | Calderwood | 210/433 M X |
| 3,680,696 | 8/1972 | Movin | 210/304 X |
| 3,712,473 | 1/1973 | Ellenburg | 210/433 M X |
| 3,715,036 | 2/1973 | Hamer | 210/433 M X |
| 3,909,418 | 9/1975 | Hunter et al. | 210/433 M X |
| 3,943,057 | 3/1976 | Jamet et al. | 210/433 M X |

Primary Examiner—Wilbur L. Bascomb, Jr.
Assistant Examiner—Robert H. Spitzer
Attorney, Agent, or Firm—Richard L. Schwaab

[57] ABSTRACT

A method of membrane filtration of a liquid and an apparatus for carrying out such a method, the apparatus comprising at least two support members including a first and a last support member of porous material arranged in series each support member including a plurality of liquid flow passageways therethrough, whereby liquid flow from the inlet means to the outlet means is possible; inlet means for admitting a liquid to be filtered to the first support member; outlet means for withdrawing a concentrate from the last support member; a semipermeable membrane covering all surfaces of the support members in contact with the liquid; means for providing that flow of liquid from one support means to the next is only via the passageways; and means associated with each support member for withdrawing permeate from therewithin.

44 Claims, 8 Drawing Figures

APPARATUS AND PROCESS FOR MEMBRANE FILTRATION

BACKGROUND OF THE INVENTION

The invention relates to apparatus for separating mixtures of substances, such as solutions, suspensions, emulsions or dispersions, by means of membrane filtration, for example, reverse osmosis, ultrafiltration or dialysis.

In contradistinction to apparatus which operates with mechanical filters, for example, filter presses and rotating settling filters, devices for membrane filtration are suitable also for the separation of lower-molecular and ionic portions. They serve for the selective separation or concentration of individual components of solutions, suspensions, emulsions or dispersions, for example, for concentrating salt water and brackish water, for treating blood, whey, dyestuff suspensions, plastics dispersions, oil/water emulsions or enzymes, for removing acid from wine or for reducing alcohol in beer.

Numerous devices for membrane filtration, also called modules, have been proposed and they may be divided into dynamic and static devices according to their method of operation.

In membrane filtration carried out with dynamic device as described, for example, in German Offenlegungsschrift No. 2,146,867, a higher concentration is usually achieved than with a static device. By rotation of the membrane support and flow interrupter of the dynamic module to produce turbulence, a turbulent flow of the medium to be treated is produced which counteracts too high a concentration and the deposition of solid particles on the surface of the membranes. In comparision with static devices, dynamic devices are expensive technical constructions having relatively high operating costs, and are therefore used only for special purposes.

Among the previously proposed static devices for carrying out membrane filtration are (1) tube modules and hollow fiber modules, which are similar in design to pipe assembly heat exchangers, in which the solution flows in or round circular-cylindrical surfaces, as well as (2) filter press and spiral modules in which the solution flows between parallel membrane surfaces which are either planar or only slightly curved in proportion to the distance between them.

Tube modules, as described, for example, in German Offenlegungsschrift No. 1,805,590, have tubular semipermeable membranes each attached to a porous supporting tube. Spiral modules, as described, for example, in German Offenlegungsschrift No. 1,442,420, usually consist of flat membranes with liquid-permeable material arranged between each flat membrane being wound spirally around a tube and glued thereto. Filter press modules, which are of similar design to mechanical filter presses, consist, for example, according to German Offenlegungsschrift No. 2,304,702, of a pile of alternating guide plates and membrane support members, each support member supporting a semi-permeable membrane on each side.

Spiral and hollow fiber modules are not suitable for carrying out ultrafiltration, and in the case of reverse osmosis, too, the possibility of using them is limited by the narrow cross-sections of flow for the solution. Particularly in the case of media which on concentration tend to form silt-like precipitates, blockages can occur as a result of the deposition of solids. Hollow fiber modules have the further disadvantage that the operating pressure must remain relatively low.

Filter press and tube modules, however, are suitable both for reverse osmosis and for ultrafiltration, and on account of their large cross-section of flow do not have the above disadvantages of the spiral and hollow fiber modules.

One of the most important requirements in the design of a module is the provision of a packing density of the module which is as large as possible, that is, as large as possible a membrane surface should be arranged in as small as possible a module volume so that with a small plant space requirement an optimal exploitation of construction material is achieved. Filter press and tube modules do not do justice to this requirement; in comparison with other types of modules, they have a relatively low packing density.

Furthermore, previously proposed filter press modules have the disadvantage that replacement of the membrane cannot easily be carried out and there is the danger that the newly introduced membrane will be damaged. Although in U.S. Pat. No. 3,508,994 a filter press module is proposed in which porous carrier members are coated directly with a membrane-forming solution, so that when the membrane is changed it is not necessary to handle the sensitive membrane itself, this module has the disadvantage of having a relatively low packing density.

There is accordingly a need for apparatus suitable for carrying out membrane filtration which has a high module packing density, which is easy to assemble, and which allows the membranes and the members which support them to be changed in a simple manner, and which furthermore operates with as low as possible a local excess concentration and deposition of solids, so that the flux, that is the quantity which permeates per unit of time and per unit of membrane surfaces, remains approximately constant.

SUMMARY OF THE INVENTION

It is therefore an object of the present invention to provide an improved apparatus for the membrane filtration of a liquid.

It is also an object of the present invention to provide such an improved apparatus having a high packing density.

A further object of the invention is the provision of an improved membrane filtration apparatus which is easy to assemble.

Another object of the invention resides in the provision of an improved membrane filtration apparatus wherein the membranes and the members which support them are easy to change and replace.

Yet another object of the invention is to provide an improved filtration apparatus which operates with the lowest possible local excess concentration and deposition of solids, in order that the flux remains approximately constant.

In accomplishing these and other objects, there has been provided in accordance with the present invention an apparatus for carrying out membrane filtration of a liquid, which comprises at least two support members of porous material arranged in series, an inlet for admission of liquid to be filtered to the first support member and an outlet for egress of concentration from the last support member, each support member being provided with a plurality of passageways to allow flow of liquid through the assembly of support members in sequence from the said inlet to the said outlet, access of liquid to the porous material of each support member being only through a semipermeable membrane, and the support members being so arranged that flow of liquid from one support means to the next is only via the passageways, and each support member being provided with an outlet for permeate from within its porous material.

When the support members are made entirely of porous material, all parts of their surface to which liquid has access, both the outer walls of the members themselves and the internal walls of the passages, are covered with semipermeable membrane in order to ensure that only liquid which has passed through the semipermeable membrane (i.e., permeate) can enter the internal pores of the support member. The porous liquid-permeable material of the support members serves to conduct away the permeate.

Peripheral sealing is perferably provided between each two adjacent support members in order to prevent liquid from passing around a support member instead of through its passageways. Thus, the passageways provide the only route for liquid from one side of a support member to the other.

The support members are preferably of circular-cylindrical disc shape, the diameter being large in relation to the thickness, and are preferably arranged in series one behind the other, with their axes co-linear, to form a substantially circular-cylindrical assembly.

The present invention also provides a process for the membrane filtration of a liquid, wherein the liquid is caused to flow through an assembly comprising at least two support members arranged in series, the liquid entering through an inlet to the first support member and flowing along a path constituted by a plurality of passageways through each support member, every part of the surface of each support member allowing access of liquid to the porous material being covered with a semipermeable membrane, the permeate being collected from within the porous material of each support member and the concentrate being collected at an outlet from the last support member.

Further objects, features and advantages of the invention will become apparent from the following detailed description of preferred embodiments when considered together with the attached figures of drawing.

BRIEF DESCRIPTION OF THE DRAWINGS

FIGS. 4a, 4b, 4c and 4d are fragmentary vertical sectional views, similar to FIG. 3, but showing alternative arrangements of a support member for the separator. FIG. 4d corresponding to that portion of the support member encompassed by the circle IV; and FIG. 5 is a fragmentary elevational view, looking in the direction of the arrow V of FIG. 4a.

DETAILED DESCRIPTION OF PREFERRED EMBODIMENTS

As stated above, the liquid to be treated cannot pass around the circumferential edge of a support member into the adjacent intermediate space, but flows primarily in a direction transverse to the outer surface of the support members, that is, through the passages, into the adjacent intermediate space, in contrast to previously proposed filter press modules in which the medium to be treated flows exclusively in directions parallel to the surfaces of the porous support members and if necessary passes around the circumferential edge of each support member into the next intermediate space through which it then flows in the opposite direction, also parallel to the surfaces of the porous support members.

The assembly of support members may, if desired, be contained within a housing of liquid-impermeable material, which if necessary is provided with one or more outlets for permeate. A separate collecting vessel for permeate may be included within the apparatus if desired.

Each support member is advantageously reinforced in its peripheral region by a frame of rigid, liquid-impermeable material, for example, metal. When the apparatus is designed for peripheral egress of permeate, such reinforcing frame includes an outlet for permeate on or near the peripheral edge of the support member.

The apparatus can operate satisfactorily only when the internal walls of the passageway, as well as the outer surfaces of the support members, are covered with semipermeable membrane.

The covering of support members not having passages with semipermeable membrane has already been described, and may be carried out, for example, by the method of direct dip-coating described in U.S. Pat. No. 3,508,994; it may alternatively be carried out by means of displacement bodies, an annular slot die, a compressed gas bubble or by spraying. These previously described methods are suitable also in the present case for producing a membrane which adheres firmly to the support members. Preferably, however, the support members according to the invention are covered by means of plasma polymerization, as described, for example, in J. App. Pol. Sci. 19 (1975), 1911 to 1930, ibid. 2157 to 2166. Any suitable substance, for example, polyamide or cellulose acetate, may be used as the membrane material.

The cross-section of the passages may be chosen as described and to allow relatively simple production is preferably of circular, triangular, quadrilateral or hexagonal shape.

The hydraulic diameter of the passage, which is four times the area of the cross-section of the passage divided by its circumference, should preferably be as small as the medium to be separated will allow, and is advantageously within the range of from about 0.1 to 10 mm., preferably from about 0.5 to 5 mm., in particular from about 2 to 3 mm.

The cross-sectional area of any passage is preferably at least approximately constant throughout the passage but may, if desired, be chosen so that the passage appears conical. The length of the passage and thus the length of the flow path through a support member preferably corresponds to from about one to ten times, more preferably from about four to six times, the diameter of the passage.

The passages of adjacent support members are preferably displaced with respect to each other in such a manner that the direction of flow of the medium to be treated must change in each intermediate space between two adjacent support members.

As previously mentioned, the intermediate spaces between adjacent support members are sealed so as to be impermeable to fluid, the sealing preferably being at or near the circumferential edge of each support member.

The distance between two adjacent support members is preferably substantially equal to the hydraulic diameter of the passages, and is preferably within the range of from about 0.1 to 10 mm., more preferably from about 0.5 to 5 mm., especially from about 2 to 3 mm. Any suitable material which is impermeable to fluid may be used to provide the sealing. If the seals are in the form of O-rings, i.e., if they are of circular cross-section, corresponding recesses may be provided for their accommodation in the support members in the vicinity of the circumferential edge. Suitable sealing materials include, for example, asbestos, rubber, silicone rubber and polytetrafluoroethylene.

The porous support members may comprise materials conventionally used for reverse osmosis or ultrafiltration, for example, sintered polyethylene powder or pressure-resistant paper layers, or ceramics.

Other materials suitably used include aluminum oxide, silicon nitride, sintered metal powder, for example, chromium steel powder and bronze powder, graphite, silicon carbide, and pressure-resistant felt layers consisting of synthetic fibers filled with synthetic resin and optionally reinforced with metal sheet.

The inlet for the liquid to be filtered and the outlet for the final concentrate are disposed at opposite points of the module, that is, before the first and after the last support member, respectively, and rectifier plates are preferably positioned before the first and after the last support member, respectively, to provide a particularly uniform distribution of the liquid to be treated. The plates may comprise, for example, perforated metal sheet or wire mesh. The inlet for the liquid to be filtered and the outlet for the final concentrate are preferably arranged so that the incoming liquid flows into the apparatus substantially parallel to the first rectifier plate, and the final concentrate leaves the apparatus substantially parallel to the second rectifier plate.

For optional distribution of the solution over the entire face of the rectifier plates, the incoming liquid is advantageously guided in a spiral path before passage through the initial rectifier plate, and the emerging final concentrate is also guided in a spiral path to the outlet after passage through the final rectifier plate. This may, for example, be effected by means of flow-influencing elements such as flow disturbers and/or by tangential arrangement of the inlet or outlet connection. After passing through the first rectifier plate, the liquid to be filtered impinges on the outer membrane-covered surface of the first support member, preferably substantially perpendicularly.

Figure 1:
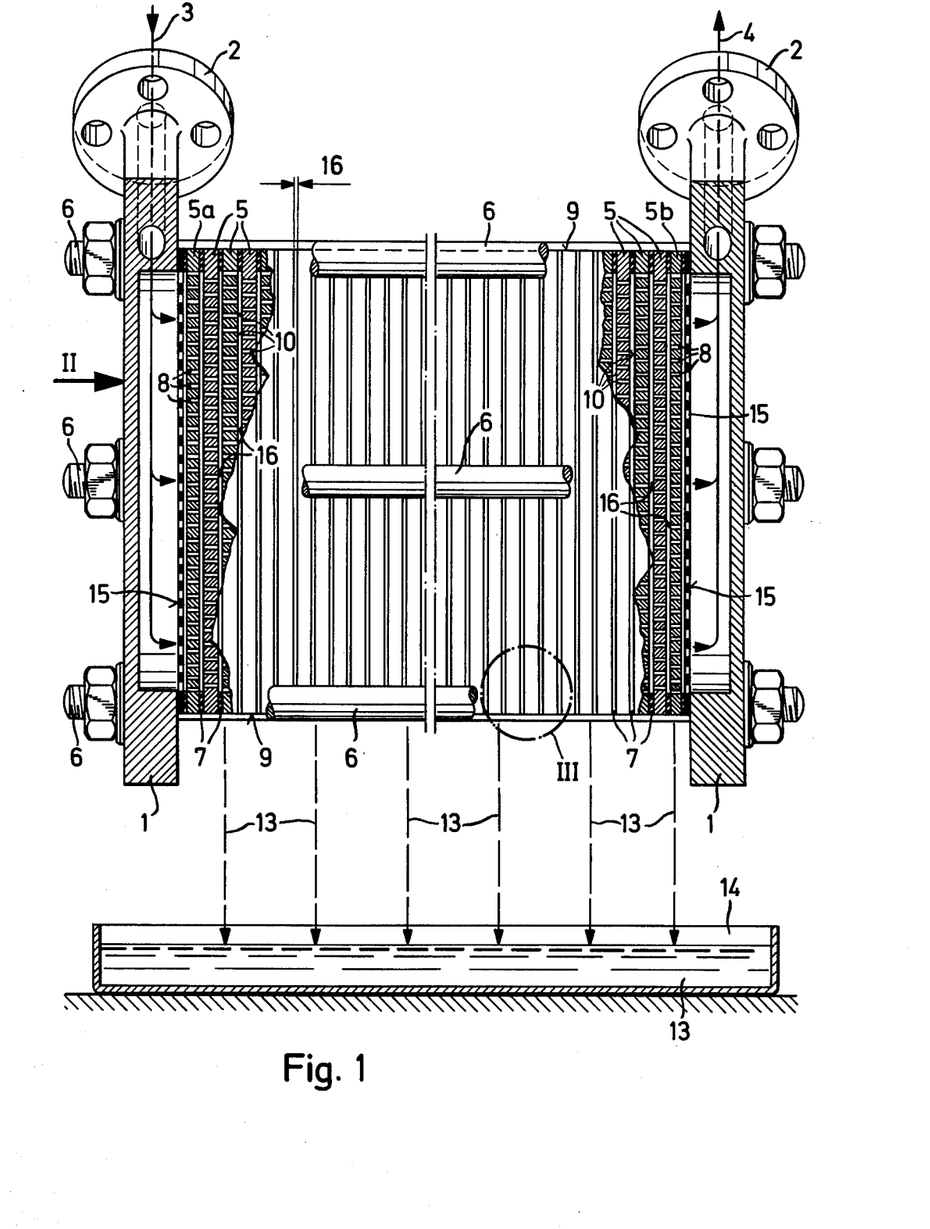
FIG. 1 is a fragmentary side view of the separator of the present invention taken substantially on the line I—I of FIG. 2, partly in elevation for purposes of clarity.
Figure 2:
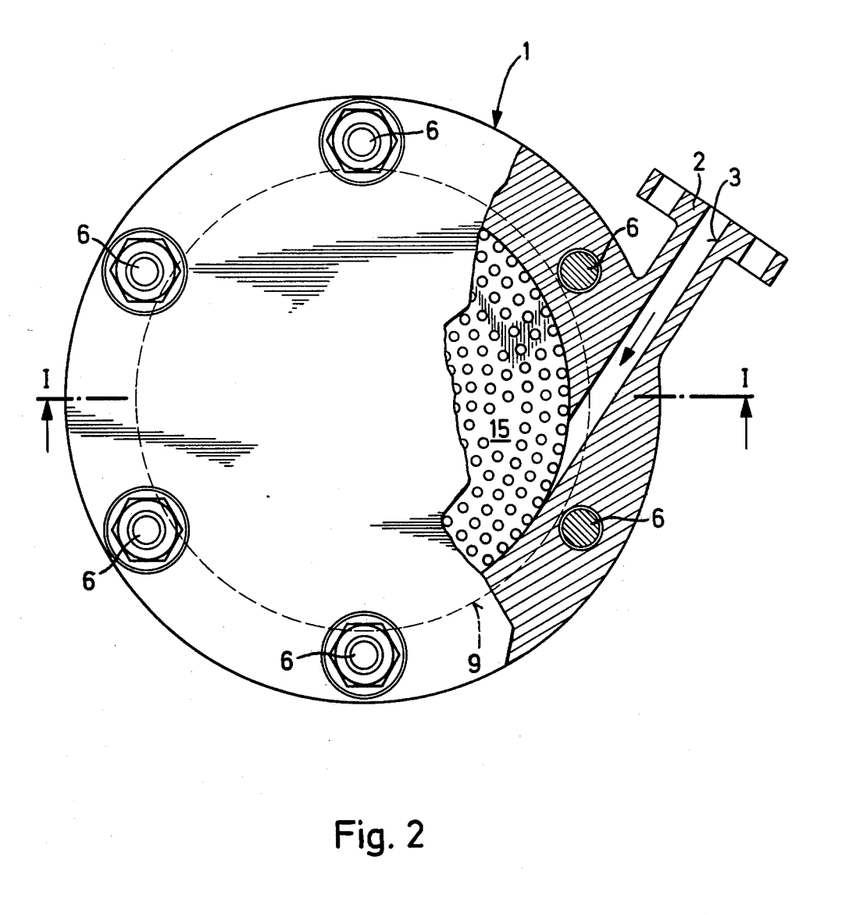
FIG. 2 is a front view of the separator of FIG. 1, partly in section, looking in the direction of the arrow II of FIG. 1.

Referring now to FIG. 1 of the accompanying drawings, the apparatus includes two circular pressure plates 1, of material resistant to corrosion by the medium to be treated, for example, stainless steel, which are provided at their circumference with connecting pipes 2 for tangential feed of crude solution 3 and tangential discharge of final concentrate 4. A plurality of disc-shaped circular-cylindrical support members 5 are pressed together between the pressure plates 1 by means of tie rods 6 made of material free of corrosion with respect to the permeate 13, for example, stainless steel. Interposed resilient sealing rings 7 seal the intermediate spaces 16 between the adjacent support members.

Each support member 5 is provided with a plurality of passages 8 and is covered on all sides, except in the region of the circumference 9, with semi-permeable membrane 10. In the region of the contact area of the support members 5 with the sealing rings 7 there are no passages through the support members 5. In this area and at the circumference 9, there is an encircling metal frame 11 for possible reinforcement of the porous support members, with an outlet 12 for the permeate 13 which is collected in a collecting vessel 14. Disposed between the first support member 5a and the adjacent pressure plate 1, the last support member 5b and the adjacent pressure plate 1, there is a flow rectifier 15, for example, a perforated sheet or a sheet of wire mesh.

Figure 3:
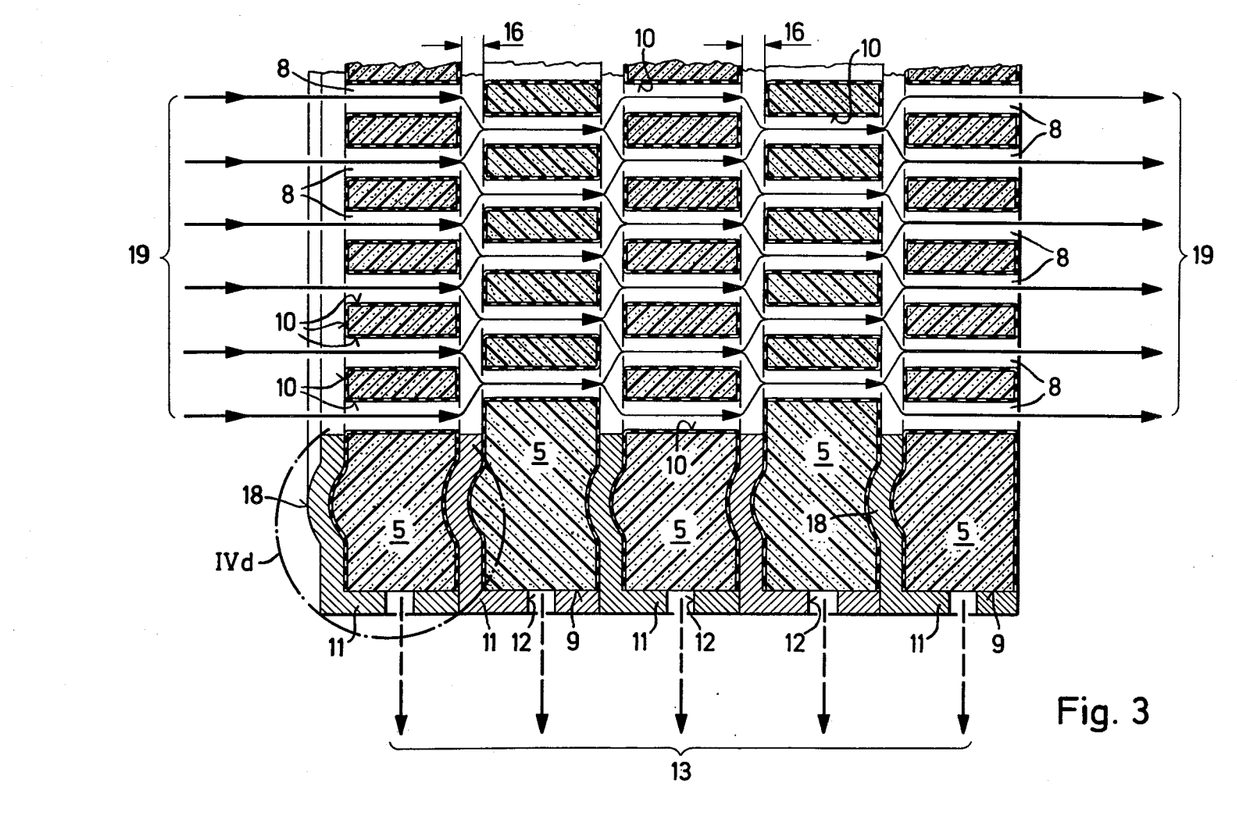
FIG. 3 is an enlarged fragmentary vertical sectional view of that portion of the separator encompassed by the circle III of FIG. 1.
Figure 4A:
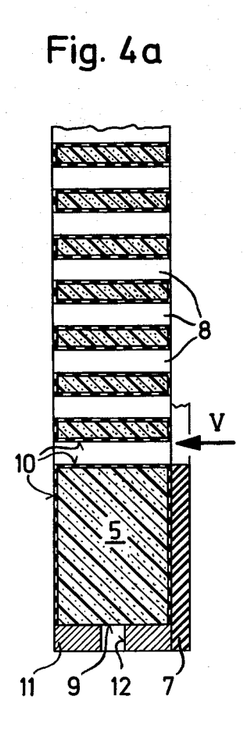
Figure 4B:
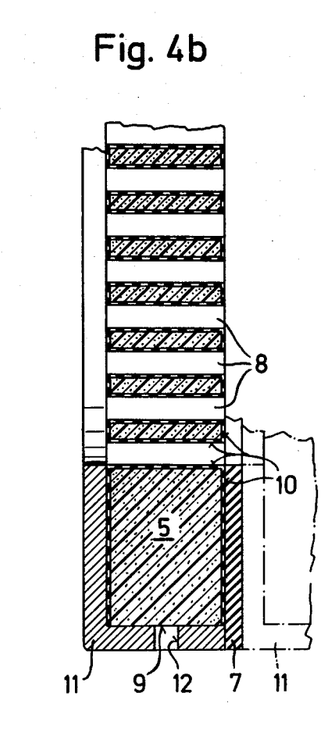
Figure 4C:
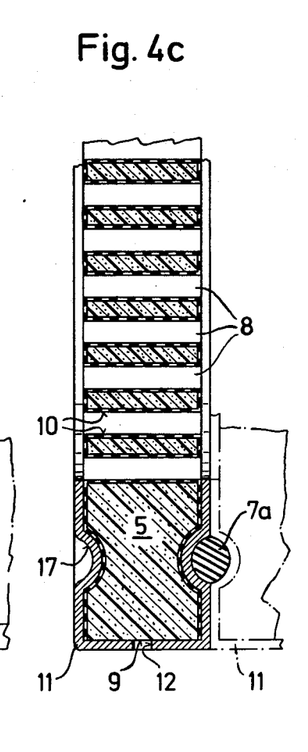
Figure 4D:
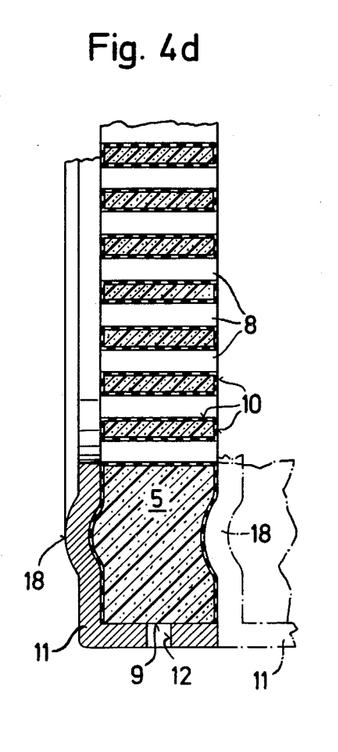
Figure 5:
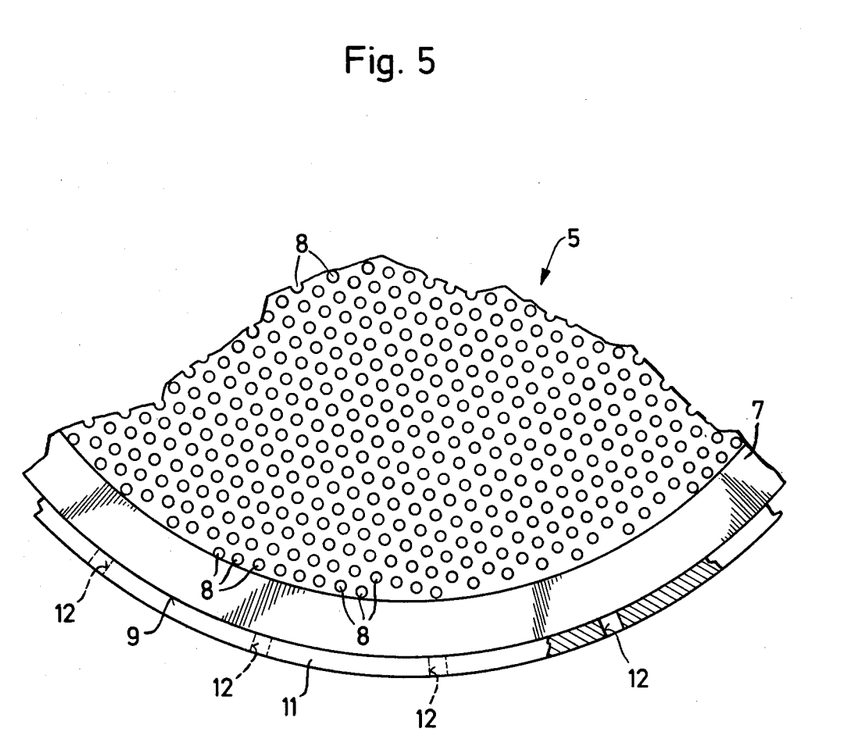

FIG. 3 is a schematic representation of the flow 19 through the module.

The metal frame 11 is shown clearly in FIGS. 3 and 4. The metal frame 11 may simply abut the circumference of the support members (FIG. 4a) or it may surround the circumference of the support members in L-shaped or U-shaped cross-section and extend into the region of the sealing areas (FIG. 4b–d). To accommodate a seal 7a in the shape of an O-ring it may be provided with a recess 17 (FIG. 4c), or it may have a sealing edge 18 (FIG. 4d), so that the use of the above-mentioned seals as fluid-impermeable material is not necessary. In the arrangement shown in FIGS. 3 and 4d, the distance between the support members is fixed by the height of the sealing edges 18.

The apparatus forming the basis of the invention has a high module packing density. By choosing suitable dimensions for the passages and a suitable distance between the support members, over-concentration or deposition of solids may be minimized and thus the flux held as nearly constant as possible. The apparatus of the invention is thus also suitable for the separation of mixtures forming precipitates.

Furthermore, the relatively simple construction of the apparatus enables the support members covered with semipermeable membrane to be replaced quickly and easily, without damage to the sensitive membrane.

What is claimed is:

1. An apparatus for carrying out membrane filtration of a liquid, which comprises:

a. at least two disc-shaped support members including a first and a last support member of porous material arranged in series and including an open space axially therebetween, each support member having a diameter which is large in relation to its thickness and including a plurality of liquid flow passageways therethrough wherein the liquid flow passageways of each support member are displaced with respect to those in each adjacent support member;

b. inlet means for admitting a liquid to be filtered to the first support member;

c. outlet means for withdrawing a concentrate from the last support member whereby liquid flow from said inlet means to said outlet means is possible;

d. a semipermeable membrane covering all surfaces of said support members in contact with the liquid, including the surfaces of said passageways and the axial end surfaces of said support members;

e. means for providing that flow of liquid from one support means to the next is only via the passageways; and f. means associated with each support member for withdrawing permeate therewithin.

2. The apparatus as claimed in claim 1, wherein the support members are circular-cylindrical discs.

3. The apparatus as claimed in claim 2, wherein the disc-shaped support members are arranged with their axes co-linear to form a substantially circular-cylindrical assembly.

4. The apparatus as claimed in claim 2, wherein the inlet means is tangential to the first support member and the outlet means for concentrate is tangential to the last support member.

5. The apparatus as claimed in claim 1, wherein said permeate withdrawal means of each support member is at or near the periphery of the support member.

6. The apparatus as claimed in claim 1, further comprising a housing of liquid-impermeable material surrounding the series of support members.

7. The apparatus as claimed in claim 6, wherein the housing includes means for withdrawing permeate.

8. The apparatus as claimed in claim 1, further comprising at least one collecting vessel for receiving permeate.

9. The apparatus as claimed in claim 1, further comprising frames of rigid liquid-impermeable material covering the circumferential portion of the support members and reinforcing the support members in their peripheral regions.

10. The apparatus as claimed in claim 9, wherein each frame includes an outlet for permeate.

11. The apparatus as claimed in claim 9, wherein the frames are of metal.

12. The apparatus as claimed in claim 9, wherein the radial cross-section of each frame is L-shaped or U-shaped.

13. The apparatus as claimed in claim 9, wherein said flow provision means comprises liquid-impermeable peripheral sealing means between each two adjacent support members to prevent passage of liquid from one side of a support member to the other around its periphery.

14. The apparatus as claimed in claim 13, wherein said sealing means comprises an annular projection on a non-circumferential part of the frame mating with a complementary annular recess on the frame of an adjacent support member.

15. The apparatus as claimed in claim 13, wherein said sealing means comprises an annular recess on a non-circumferential part of the frame on each side of the support member adapted to accommodate a sealing ring.

16. The apparatus as claimed in claim 15, wherein the recesses are shaped so as to accommodate a sealing ring of circular cross-section.

17. The apparatus as claimed in claim 13, wherein said sealing means comprises on each support member on each side near its circumferential edge an annular recess adapted to accommodate a sealing ring.

18. The apparatus as claimed in claim 17, wherein the recesses are shaped so as to accommodate a sealing ring of circular cross-section.

19. The apparatus as claimed in claim 1, wherein the passageways are of circular cross-section.

20. The apparatus as claimed in claim 1, wherein the passageways are of triangular cross-section.

21. The apparatus as claimed in claim 1, wherein the passageways are of quadrilateral cross-section.

22. The apparatus as claimed in claim 1, wherein the passageways are of hexagonal cross-section.

23. The apparatus as claimed in claim 1, wherein the hydraulic diameter of each passageway is within the range of from about 0.1 to 10 mm.

24. The apparatus as claimed in claim 23, wherein the hydraulic diameter is within the range of from about 0.5 to 5 mm.

25. The apparatus as claimed in claim 24, wherein the hydraulic diameter is within the range of from about 2 to 3 mm.

26. The apparatus as claimed in claim 1, wherein the distance between adjacent support members is within the range of from about 0.1 to 10 mm.

27. The apparatus as claimed in claim 26, wherein the distance between adjacent support members is within the range of from about 0.5 to 5 mm.

28. The apparatus as claimed in claim 27, wherein the distance between adjacent support members is within the range of from about 2 to 3 mm.

29. The apparatus as claimed in claim 1, wherein the distance between adjacent support is substantially equal to the hydraulic diameter of the passageways.

30. The apparatus as claimed in claim 1, wherein the length of the flow path of the passages is from about 1 to 10 times the hydraulic diameter.

31. The apparatus as claimed in claim 30, wherein the length of the flow path of the passages is from about 4 to 6 times the hydraulic diameter.

32. The apparatus as claimed in claim 1, further comprising a first means for regulating liquid flow positioned between the inlet means and the first support member and a second means for regulating liquid flow positioned between the last support member and the outlet means for concentrate.

33. The apparatus as claimed in claim 32, wherein the means for regulating flow comprises a perforated metal sheet or a wire mesh.

34. The apparatus as claimed in claim 1, further comprising two pressure plates connected by tie rods holding the assembly of support members therebetween.

35. The apparatus as claimed in claim 34, wherein the inlet means comprises part of one pressure plate and the outlet means for concentrate comprises part of the other.

36. The apparatus as claimed in claim 1, which includes at least one means positioned between the inlet and the first support member for effecting spiral flow of the incoming liquid.

37. The apparatus as claimed in claim 1, wherein the porous material of the support members comprises aluminum oxide, silicon nitride, graphite or silicon carbide.

38. The apparatus as claimed in claim 1, wherein the porous material of the support means comprises a powder sintered metal.

39. The apparatus as claimed in claim 38, wherein the metal is bronze or chromium steel.

40. The apparatus as claimed in claim 1, wherein the porous material of the support members comprises a felt of synthetic fibers filled with synthetic resin.

41. The apparatus as claimed in claim 40, wherein the felt further comprises a metal sheet reinforcing member.

42. The apparatus as defined in claim 1, comprising a large number of said support members arranged in series.

43. A process for the membrane filtration of a liquid, comprising the steps of causing a liquid to flow through an assembly comprising at least two disc-shaped support members of porous material arranged in series and including an open space axially therebetween, each support member having a diameter which is large in relation to its thickness and including a plurality of liquid flow passageways therethrough wherein the liquid flow passageways of each support member are displaced with respect to those in each adjacent support member, the liquid entering through an inlet to the first support member and flowing along a path constituted by the plurality of passageways through each support member, whereby the direction of liquid flow is caused to change in each of said spaces to achieve more effective contact with support members, every part of the surface of each support member coming into contact with the liquid being covered with a semipermeable membrane, whereby permeate gains access to the porous material of the support members, collecting the permeate from within the porous material of each support member and collecting the concentrate at an outlet from the last support member.

44. The process as claimed in claim 43, said process being carried out using apparatus as claimed in claim 1.

* * * * *

UNITED STATES PATENT OFFICE
CERTIFICATE OF CORRECTION

Patent No. 4,062,771           Dated December 13, 1977

Inventor(s) Wolfram SAUPE

It is certified that error appears in the above-identified patent and that said Letters Patent are hereby corrected as shown below:

Column 2, line 65, kindly change "concentration" to -- concentrate --;

Column 3, line 18, kindly change "perferably" to -- preferably --;

Column 4, line 26, kindly change "passageway" to -- passageways --;

Column 8, line 20 (i.e., Claim 29), kindly insert after "support" --members--.

Signed and Sealed this

Thirtieth Day of May 1978

[SEAL]

Attest:

RUTH C. MASON
Attesting Officer

LUTRELLE F. PARKER
Acting Commissioner of Patents and Trademarks